United States Patent [19]

Rockland

[11] Patent Number: 5,132,128
[45] Date of Patent: Jul. 21, 1992

[54] REDUCED CALORIE DESSERT TOPPING

[75] Inventor: Louis B. Rockland, Tustin, Calif.

[73] Assignee: The J. M. Smucker Company, Orrville, Ohio

[21] Appl. No.: 686,810

[22] Filed: Apr. 17, 1991

[51] Int. Cl.⁵ .................... A23G 3/00; A23L 1/307
[52] U.S. Cl. ............................ 426/658; 426/659; 426/613; 426/101; 426/631; 426/660; 426/804; 426/589
[58] Field of Search ............. 426/570, 572, 659, 660, 426/101, 100, 602, 613, 584, 589, 631, 658, 804

[56] References Cited

U.S. PATENT DOCUMENTS

| | | | |
|---|---|---|---|
| 3,966,997 | 6/1976 | Warkentin | 426/659 |
| 4,146,652 | 3/1979 | Kahn et al. | 426/602 |
| 4,414,239 | 11/1983 | Oven | 426/659 |
| 4,552,773 | 11/1985 | Kahn et al. | 426/613 |
| 5,011,704 | 4/1991 | Smagula et al. | 426/659 |

*Primary Examiner*—Jeanette Hunter
*Attorney, Agent, or Firm*—Body, Vickers & Daniels

[57] ABSTRACT

A reduced calorie, low acid (pH greater than 4.6) dessert topping having a water activity of less than 0.84 and comprising a blend of carrageenan gum, (with gelling and viscosity control) powdered cellulose bulking agent, a non-heat thinning gum cellulose bulking agent, high fructose corn syrup, a humectant and certain trace food additive amounts less than about 0.5%.

42 Claims, 3 Drawing Sheets

FIG. 2

| NO. | INGREDIENT | MOISTURE % | PROTEIN % | FAT % | ASH % | FIBER % | TOTAL CHO[1] % | CALORIES[2] Kcal/gm |
|---|---|---|---|---|---|---|---|---|
| 1 | AVICEL TYPE FD-100[3] | 6.0 | | | | 94.0 | | 0.00 |
| 2 | CARRAGEENAN, LACTARIN MV209P[3] | 12.0 | | | | 88.0 | | 0.00 |
| 3 | CARRAGEENAN, VISCARIN MV109G[3] | 12.0 | | | | 88.0 | | 0.00 |
| 4 | COCOA-PARAGON NATURAL | 4.5 | 22.2 | 11.0 | 10.7 | 5.0 | 42.9 | 1.91 |
| 5 | COCOA-SUNSET DUTCHED | 4.5 | 22.2 | 11.0 | 10.7 | 5.0 | 42.9 | 1.91 |
| 6 | DISODIUM PHOSPHATE | | | | 100.0 | | | 0.00 |
| 7 | HFCS-ISOSWEET 180 | 20.0 | | | | | 80.0 | 3.09 |
| 8 | NONFAT DRY MILK, LOW HEAT | 4.0 | 35.0 | 0.7 | 8.0 | | 52.3 | 3.58 |
| 9 | POTASSIUM SORBATE | | | | 65.0 | | | 0.00 |
| 10 | PROPYLENE GLYCOL, US[3] | | | | | | | 0.00 |
| 11 | SODIUM CHLORIDE | | | | 100.0 | | | 0.00 |
| 12 | SOLKA FLOC BW-300FCC[3] | 6.0 | | | | 94.0 | | 0.00 |
| 13 | VANILLIN | | | | | | | 4.0 |

[1] CALCULATED BY DIFFERENCE. %CARBOHYDRATE = 100 - %MOISTURE - %PROTEIN - %FAT - %ASH - %FIBER.
[2] BASED ON ATWATER SYSTEM FOR CALCULATING ENERGY VALUES AS USED IN AGRICULTURE HANDBOOK NO. 8, USDA, 1963, 1980 REVISIONS.
[3] DATA PROVIDED BY MANUFACTURER.

REDUCED CALORIE DESSERT TOPPING

The present invention relates to a dessert topping such as hot fudge topping and more particularly to a reduced calorie, low acid dessert topping of the type normally containing fat and a water activity below 0.84.

BACKGROUND OF INVENTION

One of the more popular desserts is ice cream or frozen yogurt covered with a low acid (higher than 4.6 pH) topping, such as hot fudge, caramel, butterscotch, etc. In the past, these low acid toppings contain a certain amount of fat to produce a topping having the desired shelf life, lubricity, rheological property and the desired organoleptic characteristics to obtain a topping which flows over the top of ice cream or other frozen dessert and then somewhat solidifies so that it does not drain off the dessert. Thus, ice cream toppings have contained a relatively high calorie content. For instance, a commercial hot fudge topping would contain 300 calories per hundred grams. Such calorie levels are clearly acceptable and produce a desired product. The fat gives the organoleptic characteristics needed to satisfy customers. However, there is a distinct commercial need in the mass distribution of retail products to produce toppings for frozen desserts, which topping has reduced calorie content. In the past, efforts to reduce the calorie content of a topping, such as hot fudge topping, resulted in a deterioration of the lubricity, rheolographic and/or organoleptic characteristics of the product. The hot fudge topping would solidify on the ice cream and produce a hard cap or would otherwise be clearly distinguishable from the properties anticipated by a customer for high quality hot fudge topping. Further, efforts to produce lower calories resulted in higher water activity, which was not acceptable for desired shelf life.

In the marketplace, consumers are confronted with a large number of ice cream toppings, such as hot fudge toppings to which the present invention is particularly directed, which toppings have distinct flavor and characteristics. The consumer judges the quality of the product by its taste and its physical reaction upon use. If the fudge is too viscous at room temperature, a consumer can not use the product at room temperature. If heating causes the topping to become extremely low in viscosity, then the topping drains from the cold dessert upon which it is placed. If the product does not have a substantially reduced viscosity upon heating, it can not be conveniently placed in the desired pattern on the frozen dessert. After placing on the dessert, if the hot fudge topping does not set up or become viscous at the reduced temperature of the frozen dessert, then the hot fudge topping drains from the frozen dessert and becomes somewhat distractive in appearance and less acceptable in a commercial sense. All of these commercial aspects have been generally addressed in standard hot fudge topping produced by various topping manufacturers. However, efforts to reduce the calories of these toppings have not proven successful in maintaining the same quality expected by the customer while merely reducing the calorie content of the topping and a low water activity.

THE INVENTION

The present invention relates to a hot fudge topping which has the physical attributes of a standard hot fudge topping while containing at least about ⅓ less calories than standard hot fudge formulations. The properties which are maintained by using the present invention, while still reducing the calories, are water activity of less than 0.84, a pH greater than 4.6 and generally between 5.5 and 6.5, a low coefficient of change of the water activity with temperature and a Brookfield viscosity of about 70,000 cps at room temperature and about 10,000 cps at 140° F. In addition, the reduced calorie topping of the present invention has a smooth, uniform texture at ambient temperature and on cold surfaces, with a flavor profile close to standard hot fudge topping without increasing the cost of the hot fudge topping or increasing the water activity. The present invention relates particularly to hot fudge topping; however, it is applicable to other toppings which include fat, such as caramel and butterscotch. These toppings present more of a challenge in reducing calories than fruit type toppings which include primary flavoring constituents containing virtually no fat.

In accordance with the present invention there is provided a reduced calorie, low acid dessert topping containing fat. The topping has a water activity of less than 0.84 and comprises a blend of carrageenan gums, (both gelling and viscosity control), a powdered cellulose bulking agent, a non-heat thinning cellulose gum bulking agent, high fructose corn syrup, a humectant and certain trace food items, such as disodium phosphate, potassium sorbate, sodium chloride, and vanillin. A certain amount of distilled water is added to obtain the necessary viscosity of the final product.

In accordance with a more specific aspect of the invention, the blend of carrageenan gums is in the range of 0.7–1.75% by weight of topping, the bulking agent, both powder and gum, is the range of 3.0–4.5% by weight, the high fructose corn syrup is in the range of 50–60% by weight, and the humectant is in the range of 1.0–1.5% by weight. Non-fat milk when in the dry state is in the range of 3.5–8.5% by weight. In the topping, water is added so that the water in the topping is in the range of 30–40% by weight of the topping.

In accordance with another aspect of the invention, the primary flavor constituent is cocoa powder and is included in the topping in the range of 4.0–15.0% by weight. The product uses dry non-fat milk as a part of the flavor constituent. Carrageenan gum is a blend of a gelling gum and a viscosity control gum which in practice is carrageenan with a gelling agent added and carrageenan with guar gum added, respectively. The non-heat thinning cellulose gum is microcrystalline cellulose and the powder bulking agent is cellulose powder.

The humectant is propylene glycol. This is an important constituent of the product, since it reduces the available water, thus decreasing the water activity of the topping. The combination of the carrageenan gum blend, which are gums compatible with calcium, together with the bulking agents controls the rheological characteristics of the invention and, also, decreases the water activity when used with the humectant. High fructose corn syrup is also a humectant. This further reduces the water activity of the resulting product. In the past, hot fudge topping did not include the carrageenan gum blend, or an added humectant, such as propylene glycol. In addition, regular hot fudge topping did not include the bulking agent of the present invention, which are a cellulose gum and a cellulose powder. Cellulose bulking agents are not metabolized during digestion of the product. These bulking agents are effectively a non-contributor to the calorie content of the topping.

In summary, the present invention uses high fructose corn syrup as the sweetener. This sweetener is also a humectant. In combination with this humectant sweetener, there is provided an added humectant, such as propylene glycol. In addition, the bulking agents comprise a non-calorie combination of cellulose powder and cellulose gum such as microcrystalline cellulose. These combinations of components reduces the water activity of the product while maintaining the rheological properties and organoleptic characteristics of the hot fudge topping. Thus, the product is substantially indistinguishable from a high quality hot fudge topping now on the market, with the advantage that it contains at least ⅓ less calories.

The invention relates to a "low acid" product, therefore, shelf life extension requires reduction of the water activity. High acid foods, i.e. less than a pH of 4.6, obtain stability by the acid content. This can not be employed in low acid toppings.

In practice, the water activity and product temperature characteristics are achieved with a careful selection and combination of specific ingredients including high fructose corn syrup, non-fat milk, cocoa, cellulose gel, cellulose powder, gelling carrageenan, viscosity control carrageenan (with guar gum), propylene glycol together with normal food additives, such as disodium phosphate, potassium sorbate, salt and vanillin.

The primary object of the present invention is the provision of a hot fudge topping having the physical characteristics of a standard commercial hot fudge topping with reduced calories in the general range of about ⅓ of the normal calorie content of a standard hot fudge topping.

Another object of the present invention is the provision of a hot fudge topping, as defined above, which hot fudge topping uses a blend of carrageenan gum, combined powdered and gum cellulose, together with a humectant for controlling the water activity and the rheological properties of the hot fudge topping.

Yet another object of the present invention is the provision of a mixture to be combined with a flavoring constituent for a dessert topping which is reduced in calories and still maintains the organoleptic characteristics and rheological properties of the topping.

These and other objects and advantages will become apparent from the following description using the drawings described in the next section.

BRIEF DESCRIPTION OF DRAWINGS

FIG. 2 is a table of the constituents of the present invention with their food values and calorie content; and, FIG. 3 is a pair of charts showing the effect of water activity on the rate of deterioration of a food product via mold or bacterial action.

PREFERRED EMBODIMENT OF THE INVENTION

Figure 1:
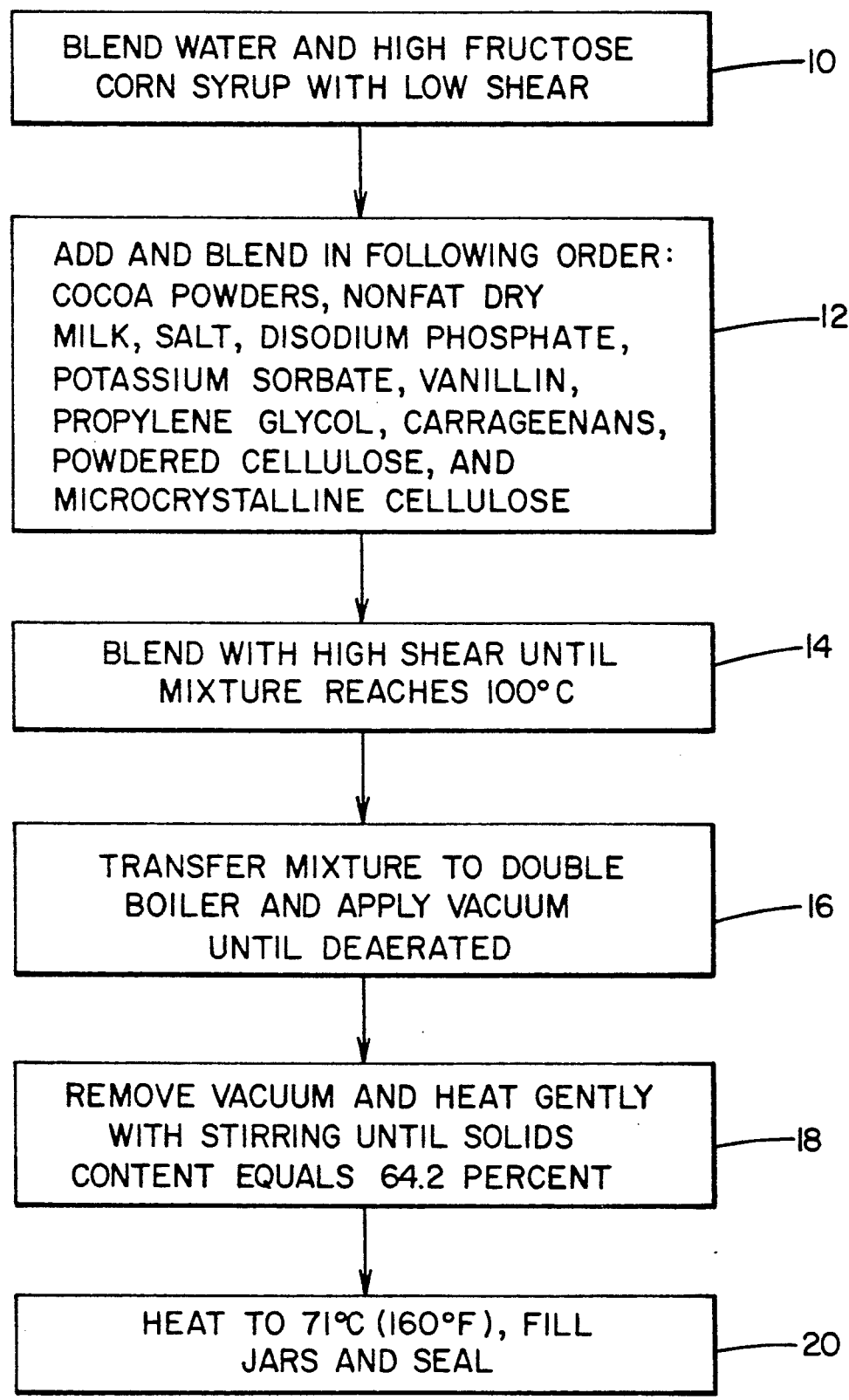
FIG. 1 is a flow diagram of the method of using the present invention.

Referring now to the drawings wherein the showings are for the purpose of illustrating the present invention and not for the purpose of limiting same, FIG. 1 shows the manufacturing steps used in manufacturing a topping formulated in accordance with the present invention. As indicated in block 10, distilled water is blended with the high fructose corn syrup in a mechanical blender. Thereafter, there is added a mixture of cocoa powders, non-fat dry milk, salt, disodium phosphate, potassium sorbate, vanillin, propylene glycol, the carrageenan blend, the powdered cellulose, and the gum cellulose. This mixture is blended into the mixture of water and syrup, as indicated in block 12. High shear mixing of the product as it is heated is carried out until the mixture reaches 100° C. as indicated in block 14. Then the mixture is transferred to a double boiler and a vacuum is applied for deaerating the product, as indicated in block 16. Then, the vacuum is removed and the product is heated gently with stirring until a solid content equals 64.2% of the product, as indicated in block 18. Thereafter, the product is heated to 71° C. at which time the hot fudge topping is filled in jars and sealed. This procedure results in a hot fudge topping in containers of the type which can be mass marketed in retail outlets. The topping has the same appearance and physical characteristics as standard topping with a calorie content over ⅓ less.

An example of a product constructed in accordance with the present invention is set forth below:

| Ingredient | Percent wt. Composition |
| --- | --- |
| ISOSWEET 180 High Fructose Corn Syrup | 54.00% |
| Nonfat Dry Milk, Low Heat | 7.44% |
| Paragon Natural Cocoa Powder | 5.20% |
| Sunset Dutched Cocoa Powder | 2.80% |
| Microcrystalline Cellulose Gum, Avicel Type FD-100 FMC Corporation, Food & Pharmaceutical Products Div., Newark, DE 19711 | 2.22% |
| Cellulose Powder, Solka-Floc BW-300 FCC James River Corp., Cellulose Floc Div., Hackensack, New Jersey 07601 | 1.60% |
| Propylene Glycol, USP Ashland Chemical Company, Santa Fe Springs, CA 90670 | 1.20% |
| Carrgeenan with guar gum, Lactarin MV 109G FMC Corporation, Marine Colloids Div., Philadelphia, PA 19103 | 0.60% |
| Carrageenan with added gelling agents, Lactarin MV 209P FMC Corporation, Marine Colloids Div., Philadelphia, PA 19103 | 0.60% |
| Disodium Phosphate | 0.10% |
| Potassium Sorbate | 0.10% |
| Sodium Chloride | 0.10% |
| Vanillin | 0.04% |
| Water (net added) | 24.00% |
|  | 100.00% |

This example has a solids content of 64.2% with 209 calories per hundred grams of product. The water activity at room temperature is 0.816. At 40° C. the water activity is 0.872. This compares to water activity of a standard product of approximately 0.87 at 40° C. and 0.815 at room temperature. The pH is 6.14 at 23.9° C. The Brookfield viscosity is 130,000 cps at 24° C., 80,000 cps at 40° C. and 36,000 cps at 60° C. The viscosity is somewhat lower than the standard product, but still within the general range of the standard product. The Bostwick viscosity is 0.6 cm at 24° C., 1.4 cm at 40° C. and 4.0 cm at 60° C.

The most current and preferred example of the present invention is set forth below:

PREFERRED EXAMPLE

| COMPONENT (Solids) | AMOUNT | BRIX |
|---|---|---|
| Isoweet Corn Syrup | 788.00 lbs. | .8000 |
| Propylene Glycol | 17.46 lbs. | .5600 |
| Cocoa-Natural | 66.00 lbs. | .9700 |
| Cocoa-Red Dutch | 50.00 lbs. | .9700 |
| Non Fat Dry Milk | 109.00 lbs. | .9650 |
| Disodium Phosphate Buffer | 23.40 oz. | 1.0000 |
| Salt - Lbs. | 1.44 lbs. | 1.0000 |
| Potassium Sorbate | 23.40 oz. | 1.0000 |
| Microcrystalline Cellulose | 32.40 lbs. | .9400 |
| Cellulose Powder | 23.40 lbs. | .9400 |
| Carrageenan with added gelling salts | 8.73 lbs. | .8800 |
| Carrageenan with added guar gum | 8.73 lbs. | .8800 |
| Vanillin | 9.27 oz. | 1.0000 |

(Solids = 64.2%)

FIG. 2 illustrates the nutritional characteristics of ingredients in the preferred example.

Figure 3:
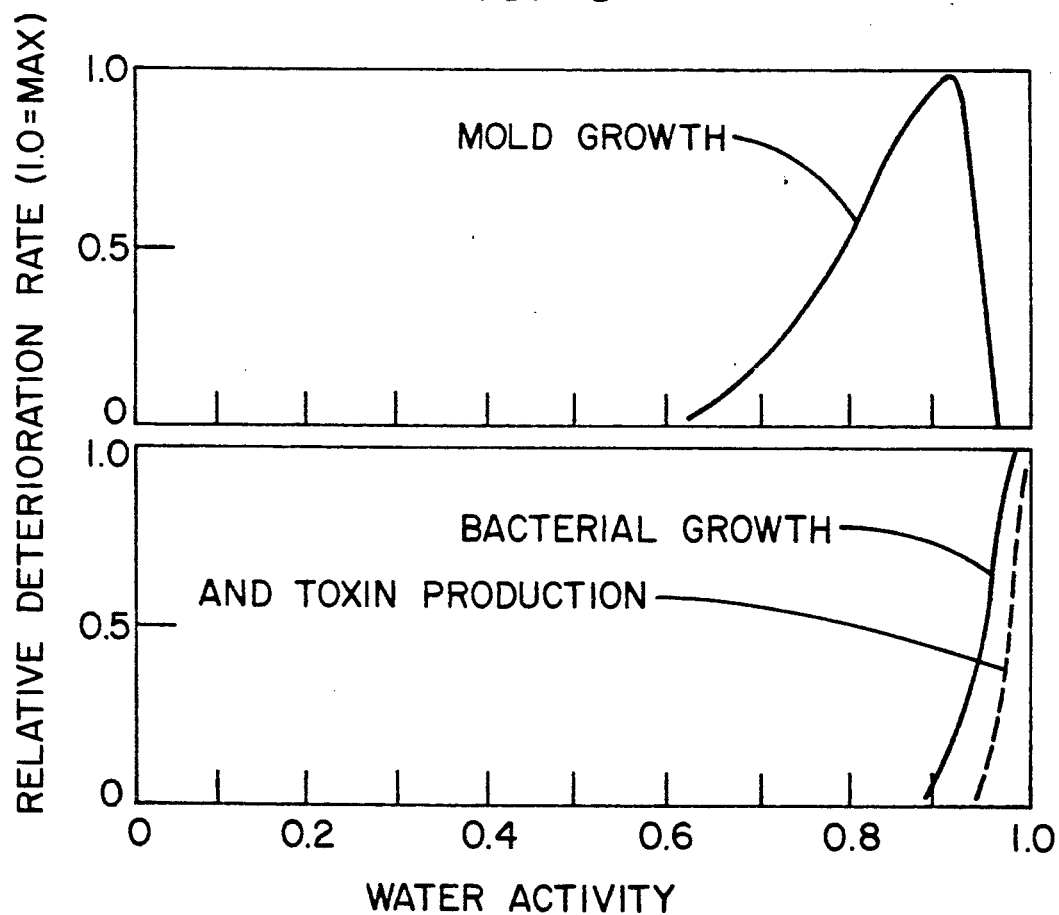

FIG. 3 illustrates standard relative deterioration of a food item at various water activity levels. As can be seen, at 0.80 water activity, detrimental bacterial growth and toxin production is non existent. In addition, the mold growth is drastically reduced at 0.80. Thus, a product constructed in accordance with the present invention is accepted as a food item and meets government regulations with respect to water activity which controls the amount of deterioration of the product over time, or shelf life. Thus, a water activity of 0.816 at room temperature, the shelf life of the product is extended and acceptable for mass produced hot fudge topping.

The invention relates to the production of the preferred embodiment as set forth above; however, in a broader sense, the invention relates to the combination of carrageenan gums, powdered and gum cellulose bulking agents, high fructose corn syrup and a humectant in combination with flavoring constituents. In a hot fudge topping, the cocoa together with the non-fat dry milk both contain fat. Mixing the hot fudge topping components with the inventive mixture of carrageenan gums, cellulose bulking agents, high fructose corn syrup and humectant, a reduced calorie topping is obtained even though there may be fat in the flavoring constituents. To define this invention in a matter of ranges, the blend of carrageenan gums is in the range of 0.75–1.75% by weight, the combined cellulose bulking agents are in the range of 3.0–4.5% by weight, the high fructose corn syrup is in the range of 50–60% by weight and the humectant is in the range of 1.0–1.5% by weight.

The cocoa powder when producing hot fudge topping is in the range of 4.0–15% by weight of the topping while the non-fat milk, if in the dry state, is in the range of 6.5–8.5%.

In performing the blending steps set forth in block 10, of FIG. 1, a Vitamix blender No. 3600 is operated at a low speed by setting the rheostat at 40–50 volts. This speed is also used in block 12 of FIG. 1. Thereafter, the volts on the rheostat are increased to 120 volts for 11 minutes to perform the blending step shown at block 14. After about 10 minutes, the product is brought to temperature. Then water is added to restore the weight of the mixture to a total original weight before transfer to the boiler, as shown in block 16. Thereafter, there is cold mixture of the product at ambient temperature of 35° C.–40° C. Vacuum of 29–30 in. Hg is applied for 20 minutes. It is heated gently to reduce the vacuum to 20–25 in. Hg for 5.0 minutes to remove water and air. This is indicated in block 18. Then, the step of block 20 occurs. Thereafter, additional water may be added to restore weight of the product.

The resulting product has ⅓ less calories than standard hot fudge topping and a water activity less than 0.84 at 70° F. The pH is in the range of 5.5–6.5. There is a low coefficient of change of the water activity and the rheological properties of the topping mimic those of standard high quality, hot fudge topping now marketed by assignee. The reduced calorie hot fudge topping has good mouth feel which mimics high fat hot fudge topping. There is good flavor release and the organoleptic properties are consistent with high quality hot fudge topping. The fat content is less than 1.0% of the product. Prior hot fudge topping included vegetable oil to provide the performance on frozen dessert and the organoleptic characteristics of the product. The present invention does not include vegetable oil and the blend of components mimics the properties imparted to the topping by vegetable oil in the past. The carrageenan gums are a combination of a gum with added gelling agents or salts and a gum with a small amount of guar gum for viscosity control. These gums are present in a 1:1 ratio. The first gum produces a gelling consistency while more viscosity is added by the second gum. Thus, by combining the two carrageenan gums, a compromise between a gelling consistency and a viscosity is obtained. These gums mimic the fat quality of prior hot fudge topping. They are also compatible with the calcium contained in the low fat milk constituent needed to produce with cocoa the fudge flavor. The cocoa is a combination of Natural and Dutch cocoa which mixture is used in the prior hot fudge toppings to produce the desired chocolate or fudge flavor. The bulking agents include a cellulose filler to replace the sugar in the prior product and also to add body to the inventive mixture. Cellulose produces a bulking or body producing quality without calories because the cellulose is not digested by humans. The first bulking agent is a powdered cellulose. The second bulking agent is microcrystalline cellulose which is a non-calorie gum which controls the body of the product at higher temperatures. This cellulose gum does not have a substantially reduced viscosity at elevated temperatures. Thus, body is maintained when the topping is heated. When the topping is heated for dispensing on the frozen dessert it does not drain off the frozen dessert. Thus, the cellulose bulking agent is a combination of powdered cellulose and cellulose gum. If the cellulose gum were used by itself, the consistency of the topping would be too thick. Without the cellulose gum, the hot fudge would be too thin when hot and too thick when cooled so it would not run over the top of the frozen dessert as desired by the discriminating consumer. As indicated in FIG. 3, it is very essential in the product that the water activity be less than about 0.90. In practice, the product must include water activity less than 0.84 which is obtained in the present invention by a combination of a humectant in the form of a propylene glycol and high fructose corn syrup which is also a humectant. The propylene glycol also serves as an emulsifier and/or surfactant. Both of these humectant constituents cause the water within the inventive product to be bound, thus, reducing the water activity. As indicated before, the carrageenan gums are used for viscosity control in the topping. The blend of carrageenan gums will interact with milk, whereas most gums will not be applicable when milk is employed in the topping. Other natural gums are not preferred in this invention. The gum must react with calcium; therefore, most other gums are eliminated. Other possible gums which could be applicable would be LM Pectins and/or alginates. However, the blend of carrageenan gum is preferred in the present invention. The high fructose corn syrup is employed as a better humectant than sucrose. Other high fructose sweeteners may be applicable such as crystalline fructose; however, this is not preferred in the present invention because of costs.

Having thus defined the invention, the following is claimed:

1. A reduced calorie, low acid dessert topping having fat, said topping containing at least about ⅓ less calories than standard toppings, having a pH greater than 4.6 and having a water activity of less than 0.84 and comprising:
   (a) a blend of carrageenan gum;
   (b) a powdered cellulose bulking agent;
   (c) a non-heat thinning cellulose gum bulking agent;
   (d) high fructose corn syrups;
   (e) an edible humectant; and,
   (f) non-fat milk.

2. A dessert topping as defined in claim 1 including cocoa powder as a flavor constituent.

3. A dessert topping as defined in claim 2 wherein said primary flavor constituent is a mixture of Natural cocoa powder and Dutched cocoa powder.

4. A dessert topping as defined in claim 3 wherein said cocoa powder is in the range of 4.0–15.0% by weight of said topping.

5. A dessert topping as defined in claim 2 wherein said cocoa powder is in the range of 4.0–15.0% by weight of said topping.

6. A dessert topping as defined in claim 1 wherein said blend of carrageenan gum includes a gelling gum and a viscosity control gum in approximately equal proportions.

7. A dessert topping as defined in claim 6 wherein said blend of carrageenan gum includes carrageenan with added gelling agents and carrageenan with guar gum.

8. A dessert topping as defined in claim 1 wherein said blend of carrageenan gum includes carrageenan with added gelling agents and carrageenan with guar gum.

9. A dessert topping as defined in claim 8 wherein said carrageenan gum is in the range of 0.75–1.75% by weight of said topping.

10. A dessert topping as defined in claim 6 wherein said carrageenan gum is in the range of 0.75–1.75% by weight of said topping.

11. A dessert topping as defined in claim 1 wherein said carrageenan gum is in the range of 0.75–1.75% by weight of said topping.

12. A dessert topping as defined in claim 11 wherein said non-heat thinning cellulose gum bulking agent is microcrystalline cellulose.

13. A dessert topping as defined in claim 8 wherein said non-heat thinning cellulose gum bulking agent is microcrystalline cellulose.

14. A dessert topping as defined in claim 1 wherein said non-heat thinning cellulose gum bulking agent is microcrystalline cellulose.

15. A dessert topping as defined in claim 1 wherein said humectant is propylene glycol.

16. A dessert topping as defined in claim 15 wherein said humectant is in the range of 1.0–1.5% by weight of said topping.

17. A dessert topping as defined in claim 9 wherein said humectant is in the range of 1.0–1.5% by weight of said topping.

18. A dessert topping as defined in claim 8 wherein said humectant is in the range of 1.0–1.5% by weight of said topping.

19. A dessert topping as defined in claim 1 wherein said humectant is in the range of 1.0–1.5% by weight of said topping.

20. A dessert topping as defined in claim 19 wherein said high fructose corn syrup is in the range of 50–60% by weight of said topping.

21. A dessert topping as defined in claim 16 wherein said high fructose corn syrup is in the range of 50–60% by weight of said topping.

22. A dessert topping as defined in claim 15 wherein said high fructose corn syrup is in the range of 50–60% by weight of said topping.

23. A dessert topping as defined in claim 9 wherein said high fructose corn syrup is in the range of 50–60% by weight of said topping.

24. A dessert topping as defined in claim 8 wherein said high fructose corn syrup is in the range of 50–60% by weight of said topping.

25. A dessert topping as defined in claim 6 wherein said high fructose corn syrup is in the range of 50–60% by weight of said topping.

26. A dessert topping as defined in claim 1 wherein said high fructose corn syrup is in the range of 50–60% by weight of said topping.

27. A dessert topping as defined in claim 1 wherein:
   (a) said blend of carrageenan gum is in the range of 0.75–1.75% by weight of said topping;
   (b) said bulking agent is in the range of 3.0–4.5% by weight of said topping;
   (c) said high fructose corn syrup is in the range of 50–60% by weight of said topping;
   (d) said humectant is in the range of 1.0–1.5% by weight of said topping; and,
   (e) said non-fat milk is dry and is in the range of 6.5–8.5% by weight of said topping.

28. A dessert topping as defined in claim 27 wherein said topping includes water in the general range of 30–40% by weight of said topping.

29. A dessert topping as defined in claim 27 including cocoa powder as a flavor constituent.

30. A dessert topping as defined in claim 27 wherein said flavor constituent is a mixture of Natural cocoa powder and Dutched cocoa powder.

31. A dessert as defined in claim 27 wherein said blend of carrageenan gum includes carrageenan with added gelling agents and carrageenan with guar gum.

32. A dessert topping as defined in claim 27 wherein said non-heat thinning cellulose gum bulking agent is microcrystalline cellulose.

33. A dessert topping as defined in claim 27 wherein said humectant is propylene glycol.

34. A mixture to produce reduced calorie, low acid dessert topping, said topping having a pH greater than 4.6 and containing at least about ⅓ less calories than standard toppings and having a water activity of less than 0.84 said mixture comprising:
   (a) a blend of carrageenan gum;
   (b) a powdered cellulose bulking agent;
   (c) a non-heat thinning cellulose gum bulking agent;

(d) high fructose corn syrups; and, (e) an edible humectant.

35. A method of making a reduced calorie, low acid hot fudge topping containing a base of cocoa, non-fat milk, and trace of food elements said hot fudge topping having a water activity of less than 0.84, having a pH greater than 4.6, containing at least about ⅓ less calories than standard toppings and comprising the step of mixing said base with a mixture of a blend of carrageenan gum, a powdered cellulose bulking agent, a non-heat thinning cellulose gum bulking agent, high fructose corn syrups, and an edible humectant.

36. A low acid dessert topping having a pH greater than 4.6, containing a flavoring constituent and a mixture containing:

(a) a blend of carrageenan gum in the range of 0.75-1.75% by weight of said topping;

(b) a cellulose bulking agent in the range of 3.0-4.5% by weight of said topping;

(c) high fructose corn syrup in the range of 50-60% by weight of said topping; and, (d) an edible humectant in the range of 1.0-1.5% by weight of said topping.

37. A dessert topping as defined in claim 36 wherein said flavor constituent is cocoa and non fat milk.

38. A dessert topping as defined in claim 37 wherein said blend of carrageenan gum includes carrageenan with added gelling agents and carrageenan with guar gum.

39. A dessert topping as defined in claim 36 wherein said blend of carrageenan gum includes carrageenan with added gelling agents and carrageenan with guar gum.

40. A dessert topping as defined in claim 37 wherein said humectant is propylene glycol.

41. A dessert topping as defined in claim 36 wherein said humectant is propylene glycol.

42. A dessert topping as defined in claim 37 wherein said cellulose bulking agent is a combination of cellulose powder and cellulose gum.

* * * * *